US011839206B2

(12) United States Patent
LaCroix

(10) Patent No.: US 11,839,206 B2
(45) Date of Patent: Dec. 12, 2023

(54) SYSTEMS AND METHODS FOR EXTERMINATION OF ANTS

(71) Applicant: Mark LaCroix, La Vernia, TX (US)

(72) Inventor: Mark LaCroix, La Vernia, TX (US)

(*) Notice: Subject to any disclaimer, the term of this patent is extended or adjusted under 35 U.S.C. 154(b) by 214 days.

(21) Appl. No.: 16/534,913

(22) Filed: Aug. 7, 2019

(65) Prior Publication Data

US 2020/0404900 A1 Dec. 31, 2020

Related U.S. Application Data

(60) Provisional application No. 62/715,716, filed on Aug. 7, 2018.

(51) Int. Cl.
*A01M 9/00* (2006.01)
*A01G 20/47* (2018.01)
*A01M 17/00* (2006.01)

(52) U.S. Cl.
CPC .......... *A01M 9/0038* (2013.01); *A01M 17/00* (2013.01); *A01G 20/47* (2018.02); *A01M 2200/011* (2013.01)

(58) Field of Classification Search
CPC ........ A01M 1/00; A01M 1/20; A01M 1/2011; A01M 1/2022; A01M 1/2027; A01M 1/2033; A01M 1/2038; A01M 9/00; A01M 9/0007; A01M 9/0015; A01M 9/0023; A01M 9/0038; A01M 9/0046; A01M 11/00; A01M 13/00; A01M 13/006; A01M 17/00; A01M 17/002; A01M 17/004; A01M 2200/011
USPC ........ 43/132.1, 131, 124; 222/630, 637, 251
See application file for complete search history.

(56) References Cited

U.S. PATENT DOCUMENTS

| | | | | |
|---|---|---|---|---|
| 2,691,236 A | * | 10/1954 | Tuft | A01M 9/0076 239/655 |
| 4,071,170 A | * | 1/1978 | Gunzel, Jr. | A01M 9/0046 222/199 |
| 4,594,807 A | * | 6/1986 | McQueen | A01M 1/08 15/339 |
| 4,742,641 A | * | 5/1988 | Cretti | E04B 1/72 43/132.1 |
| 4,768,306 A | * | 9/1988 | Hilbun | A01M 17/002 43/132.1 |
| 4,823,505 A | * | 4/1989 | Jackson | A01M 1/245 43/124 |
| 4,829,706 A | * | 5/1989 | Perry | A01M 13/006 43/127 |
| 5,154,018 A | * | 10/1992 | Livingston | A01M 17/002 43/132.1 |
| 5,226,567 A | * | 7/1993 | Sansalone | A01M 9/0092 222/195 |

(Continued)

FOREIGN PATENT DOCUMENTS

KR 200368568 Y1 * 11/2004 ............ A01M 13/00

*Primary Examiner* — Darren W Ark
*Assistant Examiner* — William L Gmoser
(74) *Attorney, Agent, or Firm* — Kirby Drake

(57) ABSTRACT

Systems and methods for extermination of ants may provide for the introduction of powder insecticide directly into an ant colony to deliver maximum saturation throughout the colony chambers or tunnels. Ants within the colony may track through the insecticide, and the insecticide may contaminate the ants' food source within the colony, thereby exterminating the ants with minimal disturbance to people or animals.

13 Claims, 9 Drawing Sheets

(56) References Cited

U.S. PATENT DOCUMENTS

| | | | | |
|---|---|---|---|---|
| 5,588,252 | A | * | 12/1996 | Jones ................... A01M 13/006 43/124 |
| 6,450,188 | B1 | * | 9/2002 | Langhart ............... A23L 3/3409 135/115 |
| 6,837,447 | B1 | * | 1/2005 | Clark .................. A01M 7/0003 239/142 |
| 6,854,208 | B1 | * | 2/2005 | Chuang ............... A01M 1/2027 261/84 |
| 6,966,145 | B1 | * | 11/2005 | Taft .................... A01M 13/003 43/107 |
| 7,108,199 | B1 | * | 9/2006 | Brown ................ A01M 1/2038 222/642 |
| 2005/0108922 | A1 | * | 5/2005 | Bianchini ........... A01M 7/0046 43/132.1 |
| 2009/0293343 | A1 | * | 12/2009 | McDonald ............ A01M 3/007 43/130 |
| 2019/0154406 | A1 | * | 5/2019 | Boyles ...................... F41H 9/06 |

\* cited by examiner

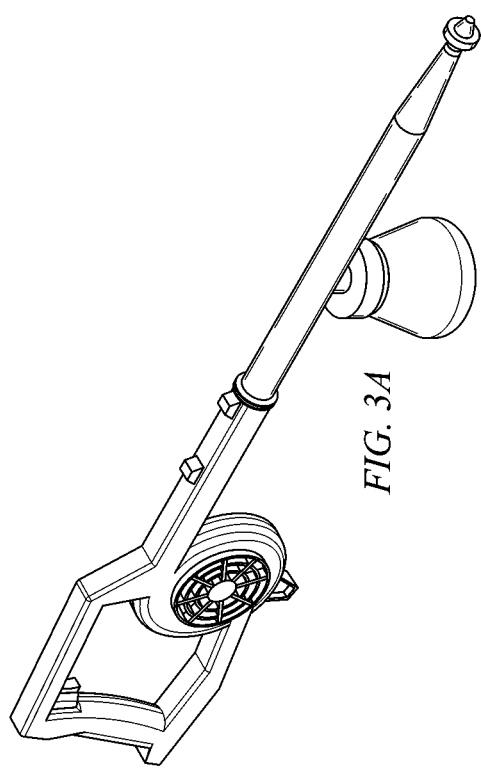
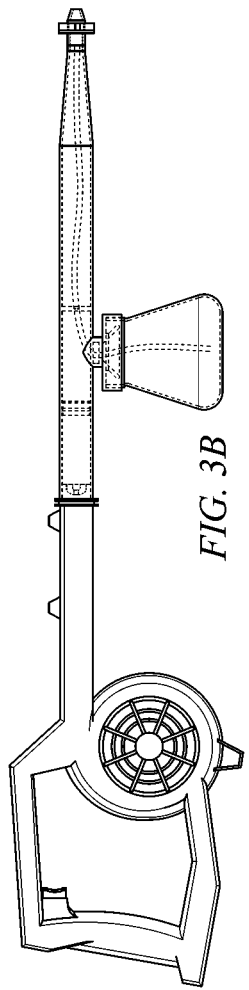
FIG. 3A
FIG. 3B

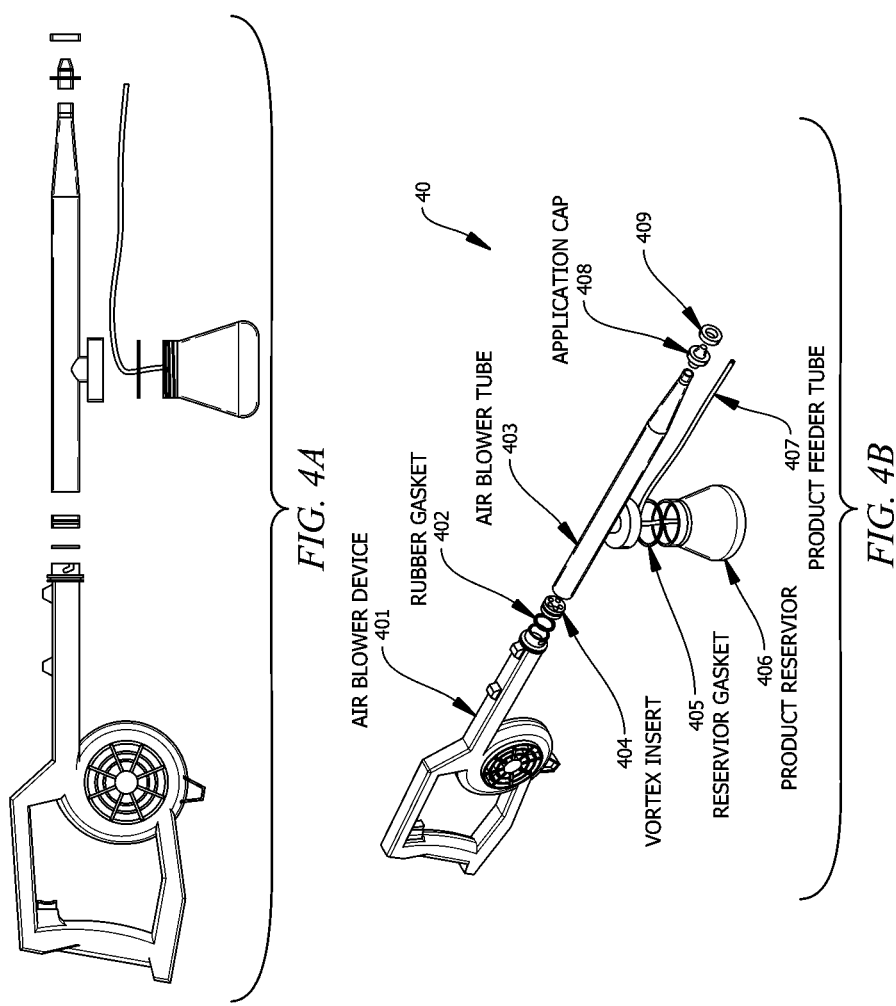

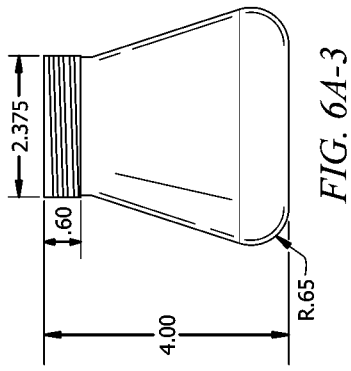
FIG. 6A-3
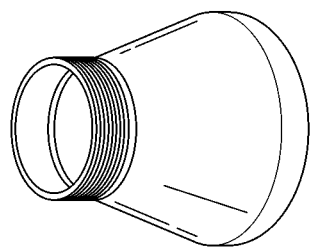
FIG. 6A-2
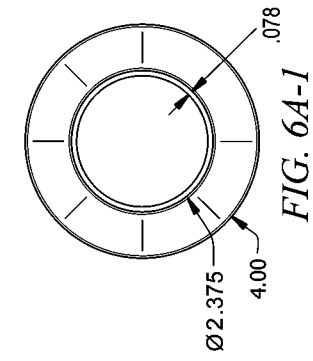
FIG. 6A-1
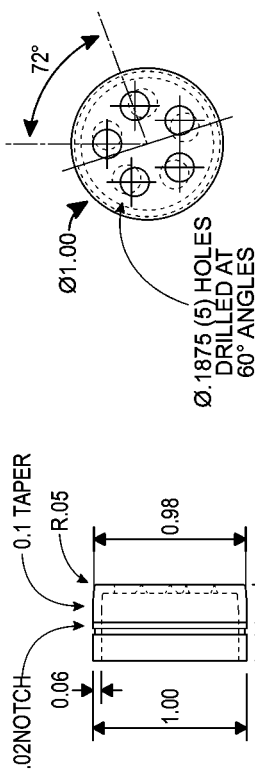
FIG. 6A-6
FIG. 6A-5
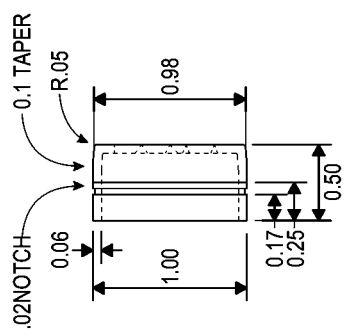
FIG. 6A-4

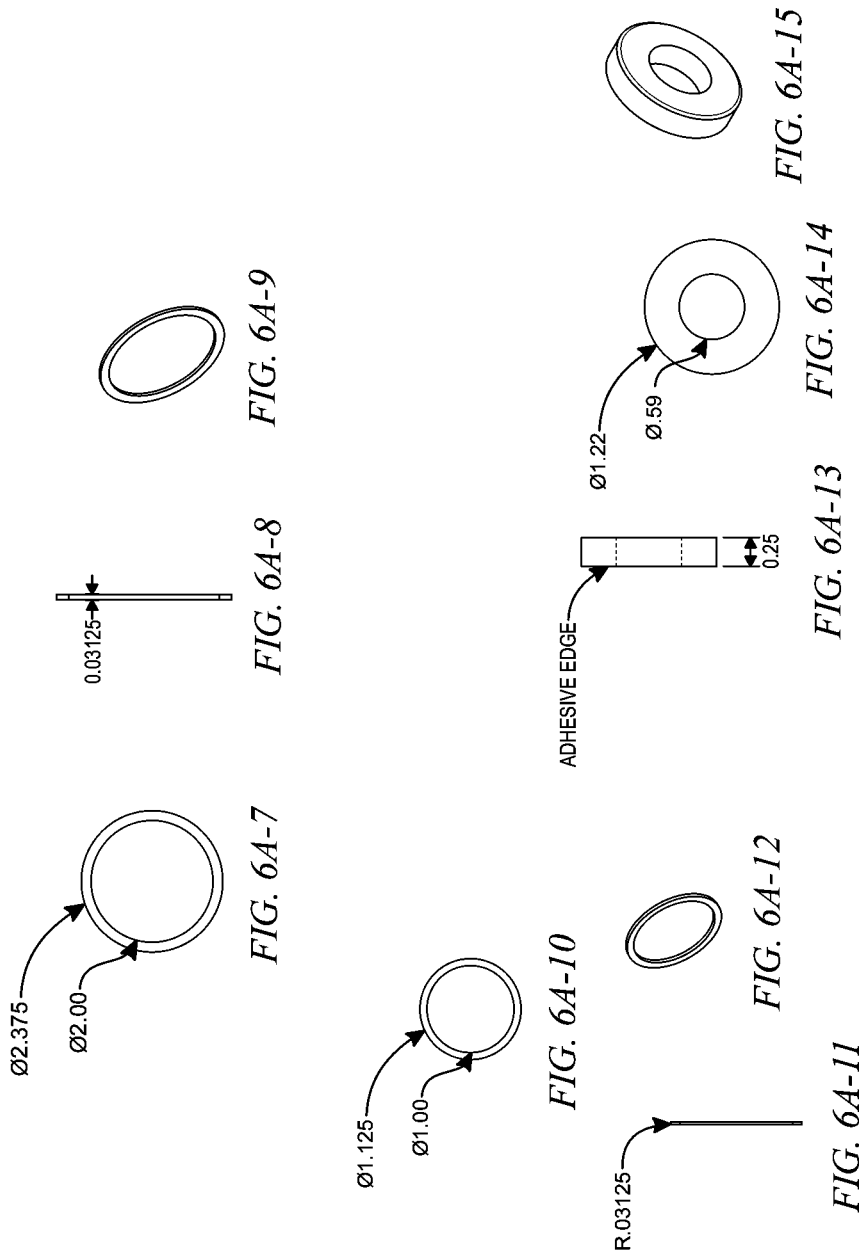

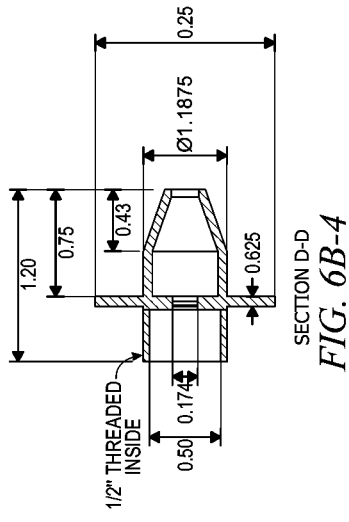
FIG. 6B-4
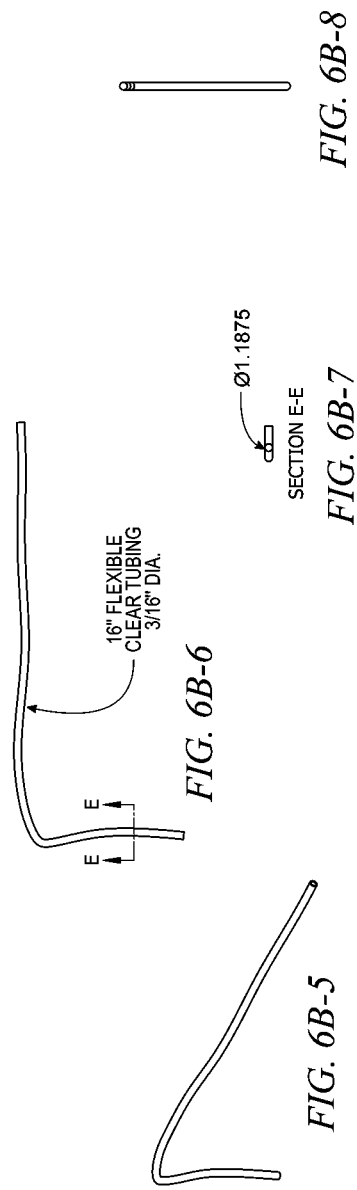
FIG. 6B-8
FIG. 6B-7
FIG. 6B-6
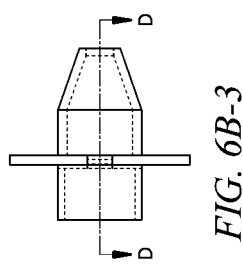
FIG. 6B-3
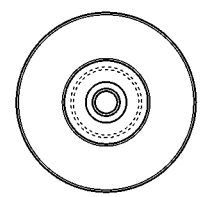
FIG. 6B-2
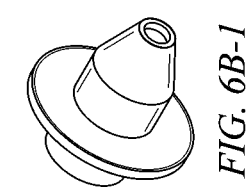
FIG. 6B-1
FIG. 6B-5

SYSTEMS AND METHODS FOR EXTERMINATION OF ANTS

CROSS-REFERENCE TO RELATED APPLICATION

This application claims the benefit of U.S. Provisional Application No. 62/715,716, filed Aug. 7, 2018, which is incorporated by reference in its entirety.

FIELD OF THE DISCLOSURE

The present disclosure generally relates to ant extermination, and more particularly to systems and methods for extermination of ants.

BACKGROUND

Ants, such as harvester ants, can be hard to extermination because of the way that their colonies are constructed as well as the sheer number of ants in each colony. Ants can destroy crops, business/home foundations, trees, gardens, flower beds, and yards. Typically, powder insecticides are introduced on a mound where a colony resides, or they may be dusted on items such as plants. However, with this method, children and animals, such as pets, may physically contact the insecticides easily due to the quantities that may be utilized. Further, morning dew, rain, and/or sprinkler systems may cause the insecticide to become wet, which reduces its effectiveness. Another problem that may arise is that a smaller number of ants may be exterminated before the remaining ants recognize that the insecticide has been introduced, and they will move locations and reemerge.

SUMMARY

Embodiments of the present disclosure may provide systems and methods for extermination of ants. Powder insecticide may be introduced directly into an ant colony to deliver maximum saturation throughout the colony chambers. Ants within the colony may track through the insecticide, and the insecticide may contaminate the ants' food source within the colony, thereby exterminating the ants with minimal disturbance to people or animals.

Embodiments of the present disclosure may provide an ant extermination system comprising: an air blower device; an air blower tube attached to the air blower device, the air blower tube having a tapered end that may be inserted into an ant colony, the tapered end comprising an application cap and a compression seal; a product reservoir attached to the air blower tube that may receive a powder insecticide; and a product feeder tube that may move the powder insecticide from the product reservoir to the tapered end of the air blower tube to be delivered into the ant colony, wherein ants in the ant colony may be exterminated through maximum saturation through tunnels of the ant colony and with minimal disturbance to people or animals. The air blower tube may further include a vortex insert that may minimize back pressure within the ant extermination system for the powder insecticide to be recirculated through the ant extermination system and into the ant colony. The air blower device may be an off-the-shelf leaf blower, wherein the air blower device may be connected to the air blower tube through a rubber gasket. The air blower device may be integral with the air blower tube. The system also may include a variable speed trigger switch that may adjust an operating speed for delivering the powder insecticide into the ant colony. The system may further include a timer and a speed control switch that may operate in conjunction with the variable speed trigger switch to adjust an amount of the powder insecticide delivered into the ant colony, for how much time and/or at what speed the powder insecticide may be delivered into the ant colony. The tapered end of the air blower tube may include one or more light-emitting diodes (LEDs). The product reservoir may receive up to 16 ounces of the powder insecticide. The compression seal may be a foam ring. A reservoir gasket may connect the product reservoir to the air blower tube. The system may include a product agitator that may circulate and fluff up the powder insecticide within the product reservoir.

Further embodiments of the present disclosure may provide a method for ant extermination comprising: locating an entrance to an ant colony; inserting a tapered end of an air blower tube into the entrance to the ant colony, the tapered end comprising an application cap and a compression seal; activating an air blower device connected to the air blower tube; compressing the compression seal to the ground around the entrance to the ant colony; and introducing a powder insecticide into ant colony through a product feeder tube that moves the powder insecticide from a product reservoir connected to the air blower tube to the tapered end of the air blower tube, wherein ants in the ant colony may be exterminated through maximum saturation through tunnels of the ant colony and with minimal disturbance to people or animals. The activating step may further include setting a speed control switch and a timer to adjust an amount of the powder insecticide introduced into the ant colony, for how much time, and/or at what speed the powder insecticide may be introduced into the ant colony. The method may further include utilizing a vortex insert in the air blower tube to minimize back pressure and recirculate the powder insecticide through the air blower tube and into the ant colony. The method also may include agitating the powder insecticide inside the product reservoir to circulate and fluff up the powder insecticide.

BRIEF DESCRIPTION OF THE DRAWINGS

For a more complete understanding of this disclosure, reference is now made to the following description, taken in conjunction with the accompanying drawings, in which:

FIG. 3A depicts a side view of an ant extermination system according to another embodiment of the present disclosure;

FIG. 3B depicts a front view of an ant extermination system according to another embodiment of the present disclosure;

FIG. 4A depicts an exploded front view of the ant extermination system of FIG. 3B;

FIG. 4B depicts an exploded side view of the ant extermination system of FIG. 3A;

FIGS. 6A1-15 depict views of certain components of the ant extermination system of FIGS. 3A-3B; and FIGS. 6B1-8 depict views of other components of the ant extermination system of FIGS. 3A-3B.

DETAILED DESCRIPTION

Figure 1:
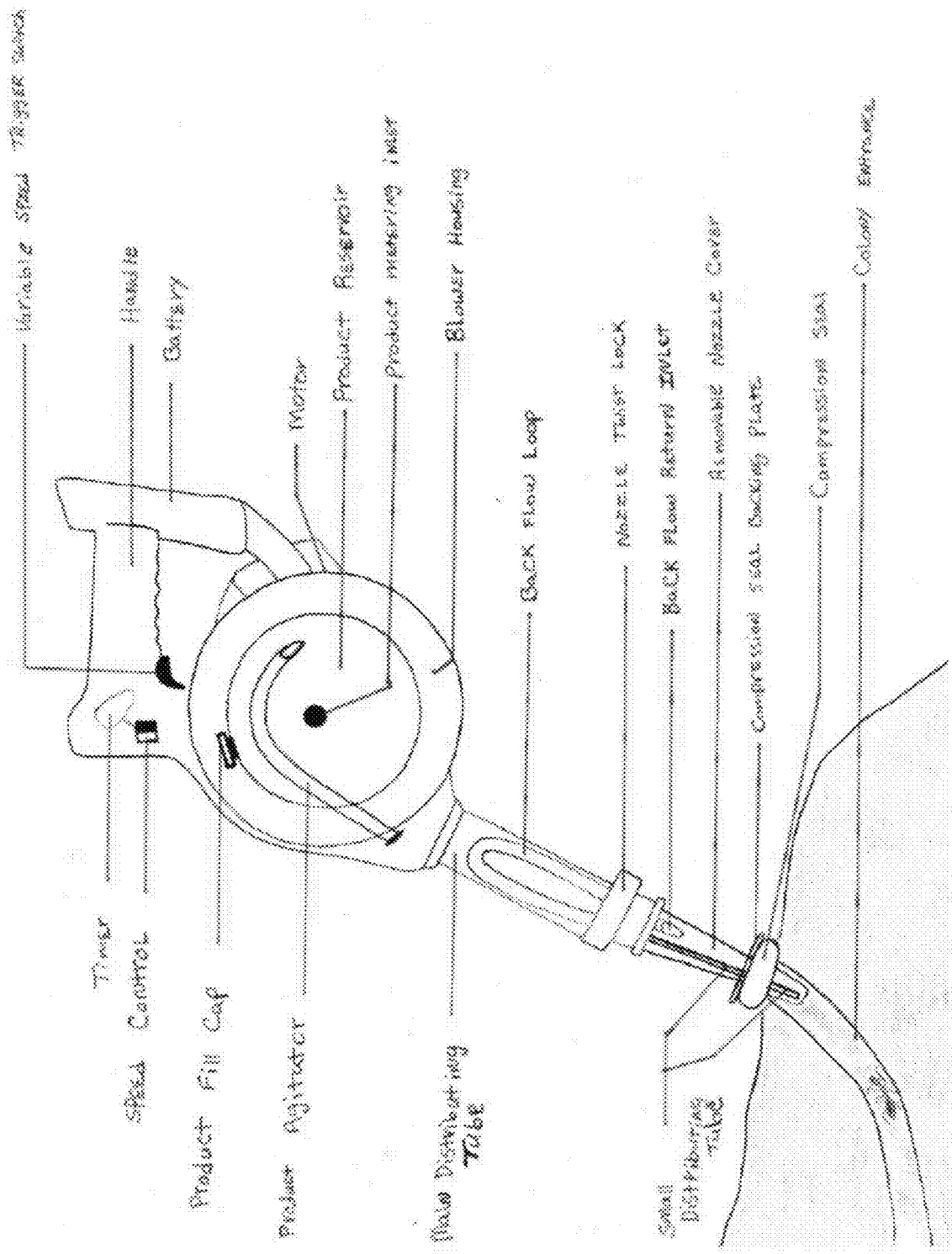
FIG. 1 depicts an ant extermination system according to an embodiment of the present disclosure.
Figure 2:
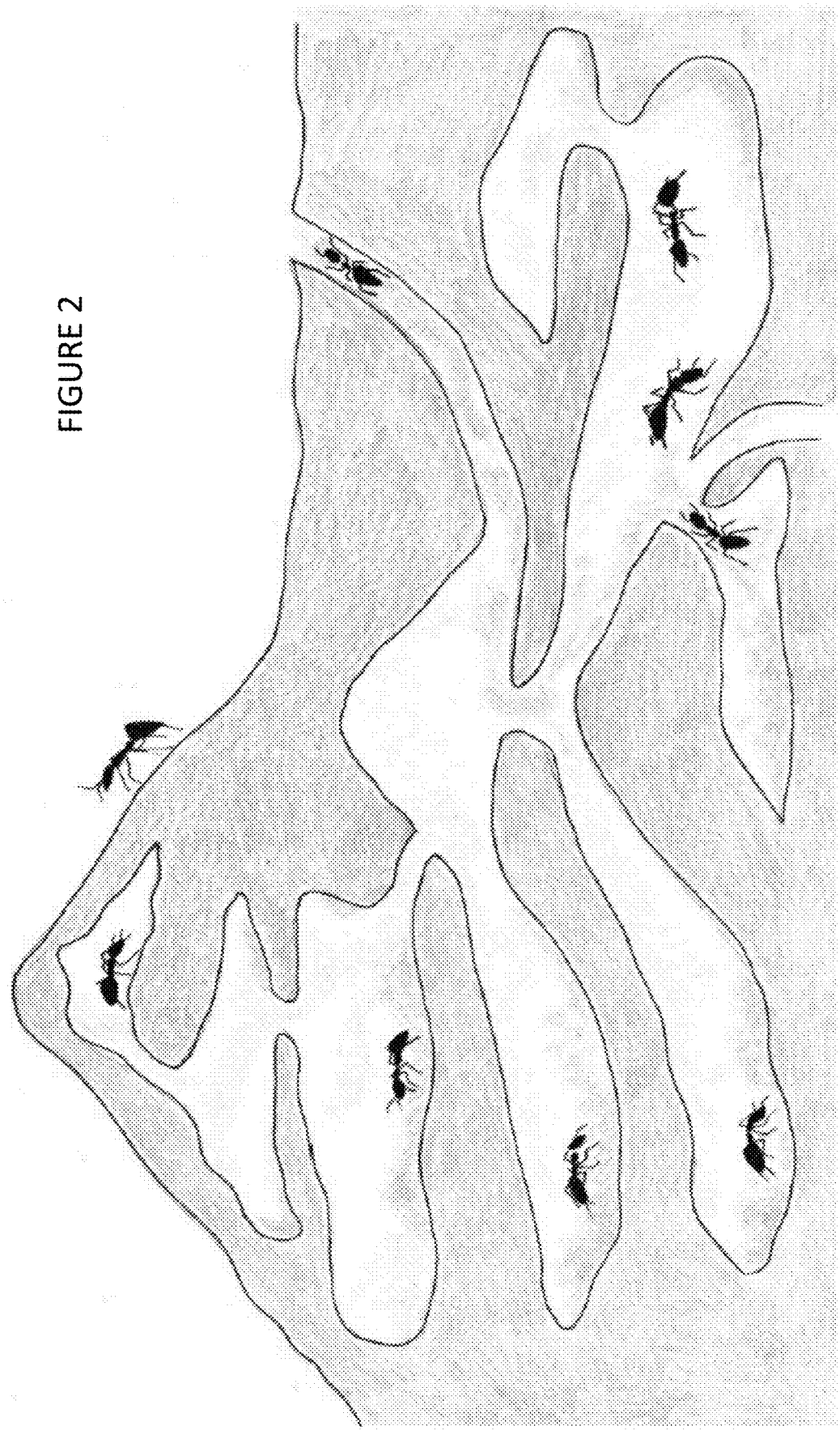
FIG. 2 depicts an ant colony that may be targeted by an ant extermination system and method according to an embodiment of the present disclosure.
Figure 5A:
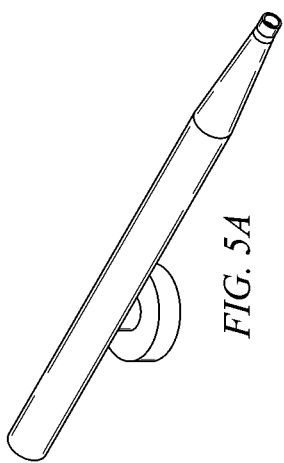
FIGS. 5A-5D depict views of the air blower tube of the ant extermination system of FIGS. 3A-3B.
Figure 5B:
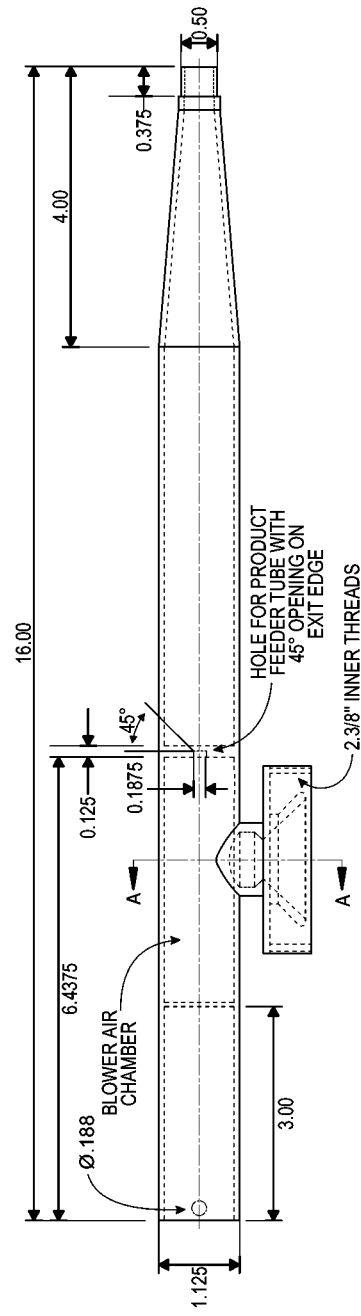
Figure 5C:
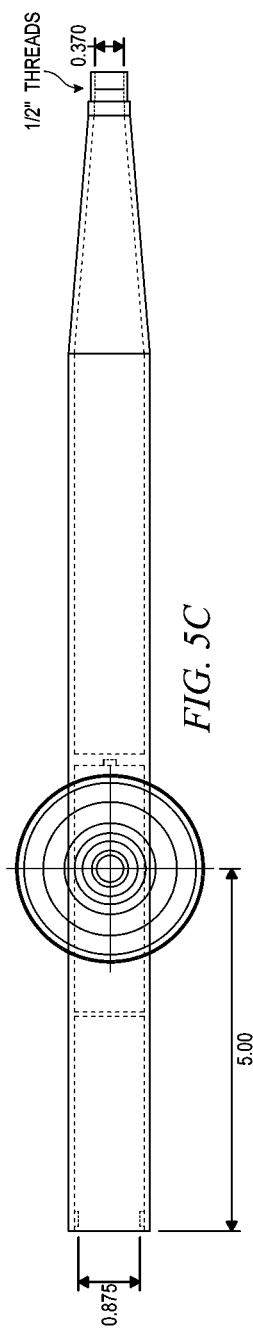
Figure 5D:
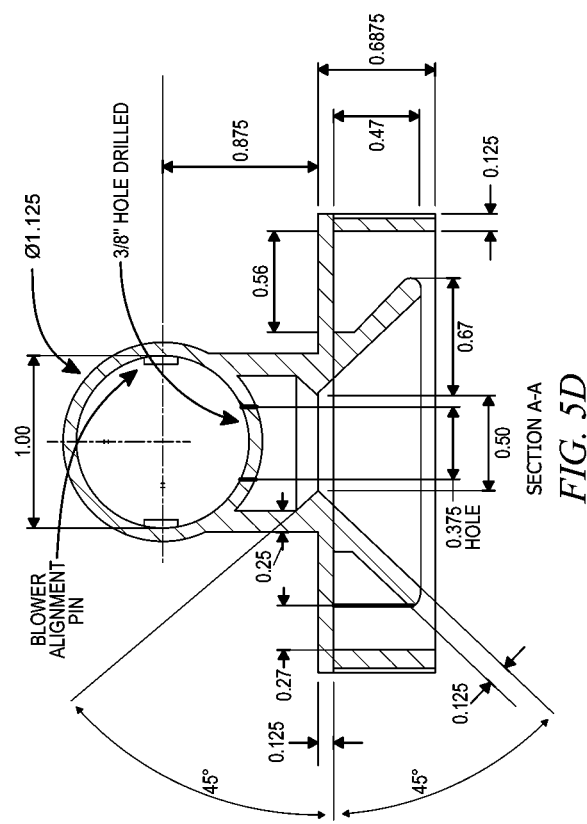

Embodiments of the present disclosure may provide systems and methods for ant extermination. In embodiments of the present disclosure, a device, such as depicted in FIG. 1, may be configured to blow a fog of powder insecticide into an ant colony. This device may deliver maximum saturation through the colony chambers, such as those depicted in FIG. 2, so that ants inside the colony may track through the insecticide that has been delivered into the colony by the device. Further, the insecticide may contaminate the ant food source stored within the colony. Using systems and methods according to embodiments of the present disclosure, ants throughout the colony may be exterminated without the negative effects experienced through traditional insecticide delivery methods.

FIG. 1 depicts an ant extermination system according to an embodiment of the present disclosure. This ant extermination system may include a variable speed trigger switch that may permit a user to select a desired operating speed for the system. In some embodiments of the present disclosure, the variable trigger switch may be retracted one or more times to change the length of time that insecticide may delivered into an ant colony. There may be some embodiments wherein a locking mechanism may be used to enable the ant extermination system to operate at a selected power setting or for a selected length of time without continued application of pressure on the trigger switch. While FIG. 1 depicts use of a variable speed trigger switch, it should be appreciated that additional or other types of switches may be employed in the ant extermination system without departing from the present disclosure. The ant extermination system also may include a timer and a speed control switch as depicted in FIG. 1 that may operate in conjunction with the variable speed trigger switch to adjust how much insecticide may be delivered into ant colony and/or for how much time and/or at what speed the insecticide may delivered into the ant colony.

As depicted in FIG. 1, a powder insecticide may be introduced into the ant extermination system by removing or unscrewing the product reservoir, and the powder insecticide may be received. In an embodiment of the present disclosure, approximately 3-4 ounces or up to approximately 16 ounces of powder insecticide may be placed into the product reservoir; however, it should be appreciated that there may be embodiments of the present disclosure where the ant extermination system may be larger or smaller in dimensions, thereby allowing for more or less powder insecticide to be introduced into the product reservoir. The powder insecticide may remain in the product reservoir until time for it to be introduced into an ant colony. It should be appreciated that various types of powder insecticide may be used with the ant extermination system without departing from the present disclosure.

When an ant extermination system, such as depicted in FIG. 1, is used, an entrance to an ant colony may be located, the speed control and timer may be set, and the tip of the nozzle may be inserted into the entrance of the colony, thereby compressing the compression seal to the ground as depicted in FIG. 1. The compression seal may include a compression seal backing plate in embodiments of the present disclosure. In an embodiment of the present disclosure, the variable speed trigger switch may be retracted for a specified period of time, such as 60 seconds. However, as described herein, other time periods such as 30 seconds or up to 120 seconds may be utilized without departing from the present disclosure. During this specified period of time, the product agitator may circulate and fluff up the powder insecticide inside the product reservoir. The powder insecticide may then move from the product reservoir through the product metering inlet and into the main distributing feeder tube. A small distributing feeder tube may be affixed to the main distributing tube to move the powder insecticide from the ant extermination system into the entrance of the ant colony. It should be appreciated that the ant extermination system may include a blower housing that may encase components, such as the product reservoir and motor as well as a fan, in embodiments of the present disclosure.

The small distributing tube may include a tip as depicted in FIG. 1 that may insert directly into the entrance of the colony. In some embodiments of the present disclosure, the tip may include one or more LED lights that may enable use of the ant extermination system at night or when insufficient light is available. The small distributing tube may include or work in conjunction with one or more additional components, such as a nozzle twist lock and a removable nozzle cover, such as depicted in FIG. 1. The lock may permit removal of the cover from the end of the small distribution tube where it may be connected. Such removal may be for cleaning and/or inspection of the small distribution tube in embodiments of the present disclosure.

An ant extermination system, such as depicted in FIG. 1, may be battery-operated to engage the motor; however, there may be other embodiments of the present disclosure where the ant extermination system may be powered through a mechanism other than a battery without departing from the present disclosure. In some embodiments of the present disclosure, the ant extermination system may include a back flow loop or vortex insert within the main distributing tube, such as depicted in FIG. 1. A back flow loop or vortex insert may be utilized to minimize back pressure within the system so that the powder insecticide may be recirculated through the system and into the colony. This type of mechanism may be useful in instances, for example, when there may be a limited number of entrances into the ant colony. If a back flow loop is utilized, the ant extermination system may include a back flow return inlet, such as depicted in FIG. 1.

An ant extermination system according to embodiments of the present disclosure may include a housing that may secure the various components (such as those depicted in FIG. 1). In some embodiments of the present disclosure, the housing may be constructed of plastic; however, other materials may be used to form the housing without departing from the present disclosure. There may be embodiments of the present disclosure wherein the ant extermination system may include an on/off switch to control when the system is in use or not.

It should be appreciated that there may be embodiments of the present disclosure where a user may utilize his/her own leaf blower or other air blower device and connect it to an air blower tube according to embodiments of the present disclosure. Accordingly, the air blower tube combined with an air blower device may form an ant extermination system according to embodiments of the present disclosure. However, an ant extermination system may be provided where an air blower device is integrated with an air blower tube as previously described without departing from the present disclosure.

FIGS. 3A and 3B provide a side view and a front view respectively of an ant extermination system according to an embodiment of the present disclosure where an off-the-shelf air blower device may be attached to an air blower tube. FIGS. 4A and 4B provide a front exploded view and a side exploded view respectively of the ant extermination system of FIGS. 3A-3B. Ant extermination system 40, as depicted in FIG. 4B, may include air blower device 401 attached to air blower tube 403 via rubber gasket 402. While rubber gasket 402 is described herein, it should be appreciated that other attachment mechanisms may be used without departing from the present disclosure. As previously discussed, air blower tube 403 may include vortex insert 404 that may be utilized to minimize back pressure within ant extermination system 40. Air blower tube 403 may include a tapered end with application cap 408 and foam ring 409. Foam ring 409 may act as a compression seal that may be pressed to the ground as described with respect to FIG. 1. Product reservoir 406 may be attached to the underside of or generally to air blower tube 403, and reservoir gasket 405 may seal the junction between product reservoir 406 and air blower tube 403 while also providing a connection point with product feeder tube 407. As depicted in FIGS. 3A-3B, the product feeder tube is threaded through the reservoir gasket into the air blower tube and through to the application cap and foam ring for use.

FIGS. 5A-D depict views of the air blower tube of the ant extermination system of FIGS. 3A-3B. More specifically, FIGS. 5A-D depict dimensions of the air blower tube according to an embodiment of the present disclosure as well as placement or attachment points for other components of the ant extermination system. For example, FIGS. 5A-D depict placement of a hole within the air blower tube for the product feeder tube as well as the inner threads for the reservoir gasket and threads associated with the application cap in an embodiment of the present disclosure. While certain dimensions are depicted in FIGS. 5A-D, it should be appreciated that the size of the ant extermination system may scale up or down depending on various factors including, but not limited to, the size of the air blower device and the size of the ant colony to be exterminated.

FIGS. 6A1-15 depict views of certain components of the ant extermination system of FIGS. 3A-3B. FIGS. 6A1-15 provide dimensions associated with the product reservoir, reservoir gasket, vortex insert, rubber blower ring, and foam ring in an embodiment of the present disclosure. As with FIGS. 5A-D, while certain dimensions are depicted, it should be appreciated that the size of the ant extermination system may scale up or down depending on various factors including, but not limited to, the size of the air blower device and the size of the ant colony to be exterminated. Further, the foam ring in FIGS. 6A1-15 is depicted as having an adhesive edge; however, there may be embodiments of the present disclosure where other attachment mechanisms may be used. Further, the vortex insert embodied in FIGS. 6A1-15 is depicted as having five holes; however, more or fewer holes may be included without departing from the present disclosure.

FIGS. 6B1-8 depict a view of other components of the ant extermination system of FIGS. 3A-3B. More specifically, FIGS. 6B1-8 depict various views of the application cap, including dimensions and positioning of threading in an embodiment of the present disclosure. FIGS. 6B1-8 depict several views of the product feeder tube according to an embodiment of the present disclosure. While the product feeder tube is depicted as a 16-inch long flexible clear tubing with a 3/16-inch diameter, it should be appreciated that the length and diameter may be larger or smaller without departing from the present disclosure.

By using systems and methods according to embodiments of the present disclosure, little, if any, powder insecticide may make contact with the ground. Accordingly, it is less likely that children and/or animals may be exposed to the powder insecticide when systems and methods according to embodiments of the present disclosure are utilized. Systems and methods according to embodiments of the present disclosure may distribute powder insecticide deep into the tunnels or chambers of an ant colony to contaminate the entire colony, including any ant food sources below the ground. Powder insecticide may be strategically placed throughout colony chambers using systems and methods according to embodiments of the present disclosure for maximum impact application. Systems and methods according to embodiments of the present disclosure may exterminate an entire ant colony. In some embodiments of the present disclosure, the ant extermination system may be utilized so that even if ants are initially drawn to the system, the ants may not (or may be less likely to) crawl inside the system.

As described herein, systems and methods for ant extermination may be used to exterminate harvester ants. While the term "harvester ants" may be utilized herein, it should be appreciated that other terms may be used to describe the same types of ants without departing from the present disclosure. Further, there may be embodiments of the present disclosure where the systems and methods may be used for extermination of other types of ants and/or pests without departing from the present disclosure. While systems and methods according to embodiments of the present disclosure may be designed to exterminate all ants in a colony, it should be appreciated that there may be embodiments where not all ants may be exterminated without departing from the present disclosure. In addition, it should be appreciated that there may be embodiments of the present disclosure wherein a single application of powder insecticide may be used to exterminate an ant colony; however, there may be other embodiments where more than one application may be needed/desired depending on factors including but not limited to the number of colonies to be exterminated and the complexity of the colon(ies) to be exterminated.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An ant extermination system comprising:
   an air blower device;
   an air blower tube attached to the air blower device, the air blower tube having a tapered end with a non-beveled microtip that is inserted into a small entrance of an ant colony, the tapered end comprising an application cap and a compression seal that compresses to the ground around the ant colony when the microtip is inserted;
   a product reservoir attached to the air blower tube that receives a powder insecticide;
   a product feeder tube that moves the powder insecticide from the product reservoir to the tapered end of the air blower tube to be delivered into the ant colony; and a reservoir gasket seals a junction between the product reservoir and the air blower tube and provides a connection point with the product feeder tube, wherein the product feeder tube is threaded through the reservoir gasket into the air blower tube, wherein the compression seal presses against a top surface of the ground to compress the compression seal along a longitudinal direction of the air blower tube, wherein ants in the ant colony are exterminated through maximum saturation through direct introduction of the powder insecticide by the microtip into the tunnels of the ant colony engulfing the ant colony in a matter of seconds without saturating the ant colony causing the tunnels to collapse and with minimal disturbance to people or animals, and wherein the queen ants are exterminated within 24 hours after introduction of the powder insecticide.

2. The ant extermination system of claim 1, the air blower tube further comprising:

a vortex insert that minimizes back pressure within the ant extermination system for the powder insecticide to be recirculated through the ant extermination system and into the ant colony.

3. The ant extermination system of claim 1, wherein the air blower device is an off-the-shelf leaf blower.

4. The ant extermination system of claim 3, wherein the air blower device is connected to the air blower tube through a rubber gasket.

5. The ant extermination system of claim 1, wherein the air blower device is integral with the air blower tube.

6. The ant extermination system of claim 1 further comprising:

a speed control switch that controls an amount of the powder insecticide picked up from the product reservoir; and a variable speed trigger that determines a rate of speed to apply the powder insecticide based on a setting selected on the speed control switch.

7. The ant extermination system of claim 1, wherein the tapered end of the air blower tube includes one or more light-emitting diodes (LEDs).

8. The ant extermination system of claim 1, wherein the product reservoir receives up to 16 ounces of the powder insecticide.

9. The ant extermination system of claim 1, wherein the compression seal is a foam ring.

10. The ant extermination system of claim 1 further comprising:

a product agitator that circulates and fluffs up the powder insecticide within the product reservoir.

11. A method for ant extermination comprising:

locating a small entrance to an ant colony;

inserting a non-beveled microtip of a tapered end of an air blower tube into the small entrance to the ant colony, the tapered end comprising an application cap and a compression seal that compresses to the ground around the ant colony when the tip is inserted;

activating an air blower device connected to the air blower tube;

compressing the compression seal to the ground around the entrance to the ant colony, wherein the compression seal presses against a top surface of the ground to compress the compression seal along a longitudinal direction of the air blower tube;

selecting a setting on a speed control switch to control an amount of a powder insecticide picked up from a product reservoir;

using a variable speed trigger, determining a rate of speed to apply the powder insecticide based on the setting selected on the speed control switch; and introducing the powder insecticide into the ant colony through a product feeder tube that moves the powder insecticide from the product reservoir connected to the air blower tube to the tapered end of the air blower tube, wherein ants in the ant colony are exterminated through maximum saturation through direct introduction of the powder insecticide by the microtip into the tunnels of the ant colony engulfing the ant colony in a matter of seconds without saturating the ant colony causing the tunnels to collapse and with minimal disturbance to people or animals, and wherein the queen ants are exterminated within 24 hours after introduction of the powder insecticide.

12. The method of claim 11 further comprising:

utilizing a vortex insert in the air blower tube to minimize back pressure and recirculate the powder insecticide through the air blower tube and into the ant colony.

13. The method of claim 11 further comprising:

agitating the powder insecticide inside the product reservoir to circulate and fluff up the powder insecticide.

\* \* \* \* \*